United States Patent
Rajpoot et al.

(10) Patent No.: US 12,143,835 B2
(45) Date of Patent: Nov. 12, 2024

(54) ACCEPTABLE COVERAGE LIMIT DETERMINATION

(71) Applicant: RAKUTEN SYMPHONY, INC., Tokyo (JP)

(72) Inventors: Atul Singh Rajpoot, Madhya Pradesh (IN); Sudeep Kumar Jain, Madhya Pradesh (IN); Durgesh Rathore, Madhya Pradesh (IN); Dharambir Bharti, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 323 days.

(21) Appl. No.: 17/646,868

(22) Filed: Jan. 4, 2022

(65) Prior Publication Data
US 2023/0217270 A1   Jul. 6, 2023

(51) Int. Cl.
*H04W 56/00*   (2009.01)
*H04W 24/02*   (2009.01)
*H04W 24/08*   (2009.01)

(52) U.S. Cl.
CPC ........... *H04W 24/02* (2013.01); *H04W 24/08* (2013.01); *H04W 56/001* (2013.01)

(58) Field of Classification Search
CPC ... H04W 24/02; H04W 24/08; H04W 56/001; H04W 56/0045; H04W 88/085
See application file for complete search history.

(56) References Cited

U.S. PATENT DOCUMENTS

| | | | |
|---|---|---|---|
| 9,826,421 B2 * | 11/2017 | Sashihara | H04W 16/32 |
| 11,665,660 B1 * | 5/2023 | Rajpoot | H04W 56/0045 370/329 |
| 11,956,731 B2 * | 4/2024 | Rajpoot | H04W 24/02 |
| 2015/0271856 A1 * | 9/2015 | Tong | H04W 16/26 455/552.1 |
| 2016/0029253 A1 * | 1/2016 | Sarkar | H04W 36/0016 455/436 |
| 2017/0048730 A1 * | 2/2017 | Sashihara | H04W 24/02 |
| 2022/0264329 A1 * | 8/2022 | Raizer | H04W 16/18 |
| 2022/0338108 A1 * | 10/2022 | Sha | H04W 48/06 |

(Continued)

FOREIGN PATENT DOCUMENTS

| | | | | |
|---|---|---|---|---|
| KR | 102505392 B1 * | 3/2023 | | |
| WO | WO-2021239238 A1 * | 12/2021 | | H04W 16/22 |
| WO | WO-2023249629 A1 * | 12/2023 | | |

*Primary Examiner* — Jay P Patel
(74) *Attorney, Agent, or Firm* — HAUPTMAN HAM, LLP

(57) ABSTRACT

An acceptable coverage limit of a base station is identified by retrieving a list of cells that are served by a first base station. Grids are generated from the first base station to a predetermined threshold distance. A plurality of selected grids is identified between an acceptable coverage limit and a threshold distance. An average reference signal is determined from the plurality of selected grids. An evaluation is made regarding whether the first base station is the dominant cell in each of the selected grids. The number of grids the selected grids where the first base station is the dominant cell site is determined based on a dominant carrier threshold. A column of grids is determined where the first base station is not the dominant cell site. An acceptable coverage limit of the cell is determined based on the distance from the first base station and the column of grids.

18 Claims, 8 Drawing Sheets

(56) References Cited

U.S. PATENT DOCUMENTS

| | | | |
|---|---|---|---|
| 2023/0209472 A1* | 6/2023 | Rajpoot | H04B 17/382 |
| | | | 455/522 |
| 2023/0388951 A1* | 11/2023 | Xu | H04W 48/10 |
| 2024/0012129 A1* | 1/2024 | Duan | G01S 5/06 |
| 2024/0049092 A1* | 2/2024 | Määttänen | H04W 36/36 |

* cited by examiner

ACCEPTABLE COVERAGE LIMIT DETERMINATION

BACKGROUND

Open Radio Access Network (RAN) is a standard for RAN interfaces that allow interoperability of equipment between vendors. Open RAN networks allow processing of information to manage the network at a central location.

The specifications of the radios, the properties at the base station varies. Radios have a design cell range that varies between manufacturers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
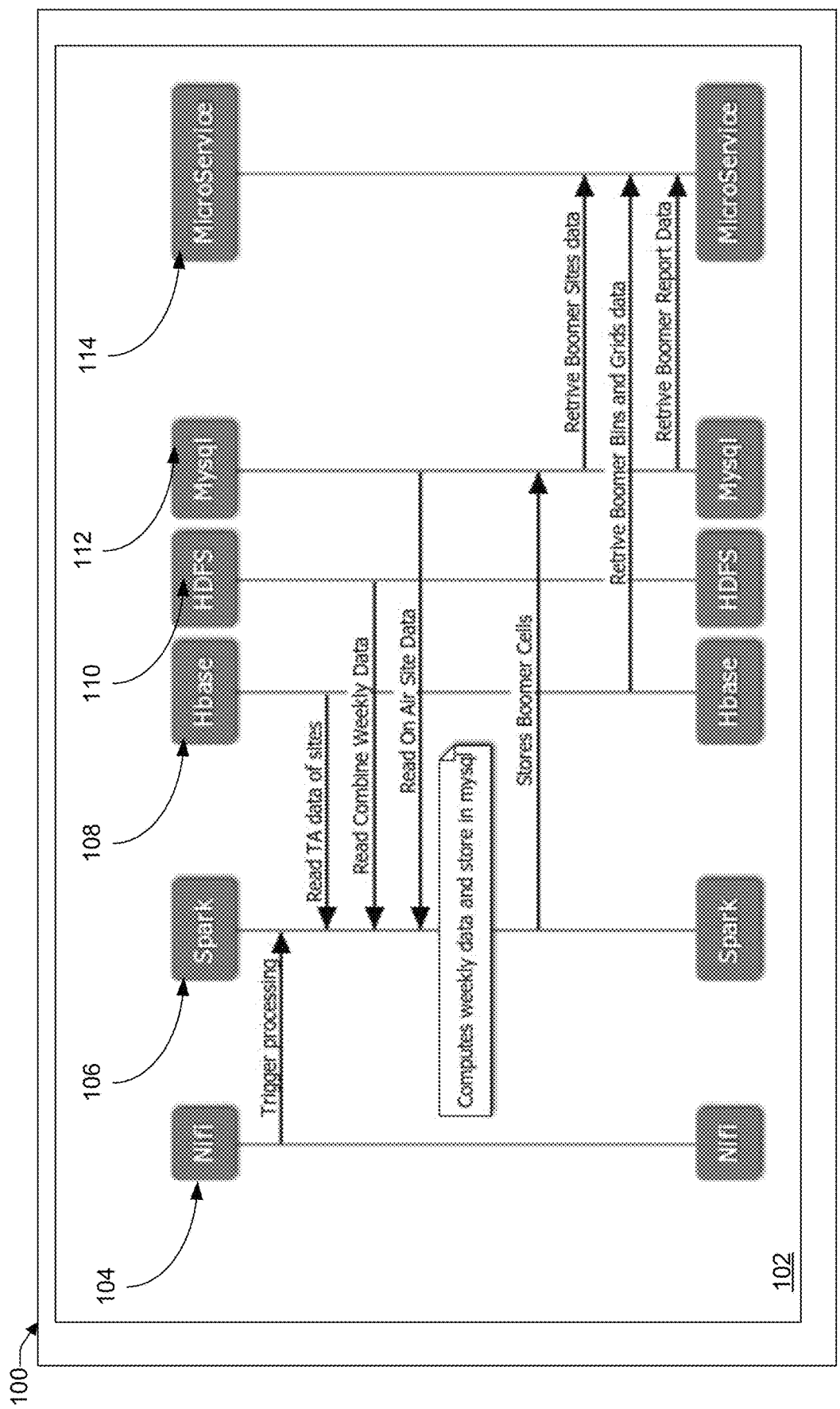
FIG. 1 is a diagram of a system acceptable coverage limit determination, according to at least one embodiment of the present system.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In some embodiments, a system determines an acceptable coverage limit based on signal information received and processed in a cloud environment for managing a radio network. In at least one example, the system is able to the acceptable coverage limit using the signal information instead of cell range based on the specifications from the manufacturers. The specification from the manufactures of the radios and other equipment are based on ideal conditions or theoretical limits based on tests devoid of real-world interference or unique properties of locations where the radios are deployed. In some embodiments, the system determines the acceptable coverage limit that is specific to a base station location based on the signal information. In some embodiments, the system is able to determine the acceptable coverage limit based on real-time signal information of a cell site or base station.

In some embodiments, the system is able to use the acceptable coverage limit to dynamically manage the open ran network. For example, the system uses the acceptable coverage limit information to change the electronic tilt of the radio on the base station to target a location within the cell site where a majority of the users are present. In at least one example, the system uses the acceptable coverage limit in real-time to optimize the radio network during transient changes to usage patterns. In at least one example, the system uses the acceptable coverage limit information in real-time to optimize the radio network instead of deploying additional base stations or radios based on the number of users in a specific location that are experiencing bad network coverage. In at least one example, the system uses the acceptable coverage limit information to determine whether deploying additional base stations is more optimal compared to leasing additional network coverage from a partner network.

In some embodiments, a system determines an acceptable coverage limit of a base station is identified in a cloud native environment by retrieving a list of cells that are served by a first base station from a site database that includes a predetermined threshold of sufficient geo-located samples that are beyond the cell range or the acceptable coverage limit. In some embodiments, the system generates a plurality of girds from the first base station to a predetermined threshold distance in the direction of the azimuth of the first base station. In some embodiments, the system identifies a plurality of selected grids that are between the acceptable coverage limit and the predetermined threshold distance from the plurality of grids. In some embodiments, the system determines an average reference signal received power from the first base station in the cell site located within each of the plurality of selected grids. In some embodiments, the system determines a median grid level reference signal received power for cell sites from base stations that are received at each of the plurality of selected gird. In some embodiments the system determines whether the first base station is the dominant cell in each of the plurality of selected grids based on the average reference signal received power. In some embodiments, the system determines the median grid level reference signal, determining the number of grids in the plurality of selected grids where the first base station is the dominant cell site based on a dominant carrier threshold, determining a column of grids where the first base station is no longer the dominant cell site based on the dominant carrier threshold. In some embodiments, the system determines the acceptable coverage limit of the cell based on the distance from the first base station and the determined column of girds.

FIG. 1 is a diagram of a system 100 for acceptable coverage limit determination, according to at least one embodiment of the present system. The diagram includes system 100 for hosting a cloud architecture 102. The system 100 includes components described hereinafter in FIG. 8. In some embodiments, the system 100 is hosted on a cluster of servers, such as a cloud service. In some embodiments, the system 100 hosts a public cloud. In some embodiments, the system 100 hosts a private cloud.

The system 100 includes a NiFi component 104, a spark component 106, an HBase component 108, a HDFS component 110, a MySQL component 112, and a micro service component 114. In some examples, the operations of the components of the system 100 are executed by a processor. In some examples, the operations of the components of the system 100 are executed on different processors. In some examples, the operations of the components of the system 100 are split between multiple processors.

The NIFI component 104 is configured to ingest streaming data from multiple sources, such as devices connected to a cloud service, other servers and sources in real-time or from a database. In some embodiments, NIFI component 104 operates in a cluster. In at least one example, the cluster includes a group of nodes hosted on virtual machines and connected within a virtual private cloud. Examples of NIFI components include an event hub or a kinesis service in a cloud service. The NIFI component 104 is configured to assist in flow-based programming, such as data from radio access networks. In some embodiments, NIFI component 104 triggers processing based on data arriving from the radio access network. In some embodiments, NiFi component 104 triggers processing periodically. In some embodiments, NiFi component 104 triggers processing when the data ingested exceeds a predetermined data threshold.

The spark component 106 is configured to parallel process a large set of data such as streaming data from a radio access network. In some embodiments the spark component 106 operates in a cluster. The spark component 106 is configured to handle a stream of data either in real-time or in batches.

The Hbase component 108 is configured to store column oriented non-relational data in a database. In some embodiments, the Hbase component 108 runs on top of Hadoop Distributed File System (HDFS) component 110. Hbase component 108 is configured to store large data sets such as data produced by a cellular network.

The HDFS component 110 is configured to store raw data from multiple sources, such as devices connected to a cloud service, other servers and sources in real-time or from a database. In some embodiments, batch processing data is stored in the HDFS component 110 before the data is processed through the spark component 106. The MySQL component 112 is configured to store processed data. In some embodiments, the MySQL component 112 serves any real-time user interface elements. In some embodiments, the MySQL component 112 stores aggregated and correlated data after processing.

The micro services component 114 is configured to run as a collection of services. In some embodiments, the micro services component 114 provides a collection of services that are easy to maintain, easy to test, are loosely coupled between the services, and independently deployable.

In some embodiments, the Nifi component 104 triggers processing when the data is received from a radio device or a base station. The Nifi component 104 passes information to the spark component 106. The spark component 106 processes information from multiple sources such as reading the data from the Hbase component 108, the hdfs component 110 and the MySQL component 112. For example, the spark component 16 can process information about the data from the cell sites stored in the Hbase component 108, the combined weekly data from the cell sites stored in the hdfs component 109 and the on air side data stored in the MySQL component 112 to compute the boomer cells to store the information in the MySQL component 112.

In at least one example, the micro service component 114 retrieves information from the MySQL component 112, the Hbase component 108, and the HDFS component to visualize the information for presentation using a graphical user interface. In some embodiments, the micro services component 114 retrieves the bomber bins and grids data from the Hbase component 108. In some embodiments, the micro services component 114 retrieves information from the MySQL component about the booming sites to visualize the information.

The system 100 is configured to perform auto cell range determination. In some embodiments, the system 100 includes a cloud architecture that receives data from a radio access network. Example of the data received includes a site database. In some embodiments, the site database is hosted on the MySQL component 112. In some embodiments, the site database includes information from one or more of the cell sites or base stations in the radio access network including the Latitude, Longitude, Azimuth, band details, on-air status, on-air date, evolved NodeB IDentifier, E-UTRAN Cell Global Identifier, Antenna height, Electrical tilt, Mechanical tilt and the like. In some embodiments, the cloud architecture receives clutter data of the base station or cell site such as morphology of the cell site or base station.

In some embodiments, the system 100 receives geographical boundaries. In at least one example, a geographical boundary is a cell network boundary, an acceptable coverage limit for a base station and the like. In some embodiments, the system 100 receives a best server plot. In some embodiments, the best server plot data is received from a predictive coverage tool for on-air sites or base station.

In some embodiments, the system 100 receives geo-located data collected using drive test tools, as well as passively collected data from users in the network. For example, the geo-located data is based on user equipment data from the last seven days. In some embodiments, the system 100 receives data such as the above mean sea level heights of radios, antennas or both at a cell site or a base station. In some embodiments, the system 100 receives PM KPI including timing advance distribution sample counts, mean CQL, DL MCS, Mean UL MCS and the like.

In some embodiments, the system 100 receives information such as the tilt parameters for electrical tilt. In some embodiments, the system 100 receives data about new cell sites or base stations in the network in the past seven days.

The system 100 is configured to automatically detect cell range for a first base station 230 or a cell site. In some embodiments, the system 100 determines a sector 202 (FIG. 2) at a first base station 230. In some embodiments, the system 100 determines the sector 202 (shown in FIG. 2) based on the morphology, the longitude, latitude and azimuth of the radio or antenna. In some embodiments, the sector 202 encloses a 210 degree sector with a center at the longitude and latitude of the cell site or a first base station in the direction of the beam of the radio network.

In some embodiments, the system 100 determines a sector 105 degrees to the left and the right side of the azimuth line of the radio or antenna. In some embodiments, the system 100 divides the sector 202 into subsectors 204a-g. In some embodiments, the system 100 divides the section of 210 degrees into seven subsectors 204a-g of 30 degrees each. In some embodiments, the number of subsectors is based on the bearing angle and coverage of the radio signals. In some embodiments, the number of subsectors is based on the processing load on the system 100, which increases without a significant improvement in performance of the system 100.

If the number of subsectors is too small, the system 100 has difficulty determining a nearest neighbor because of the bearing angle and the width of the coverage of the radio networks in the field. In some embodiments, the system 100 determines the sector size using a maximum search limit threshold. In at least one example, the maximum search limit threshold is 6000 meters. In some embodiments, the maximum search limit threshold is based on manufacturer specifications detailing the range where the equipment provides optimal coverage. In some embodiments, if the maximum search limit threshold is too high the processing load on the system 100 increases without a significant improvement in performance of the system 100. In some embodiments, the system 100 determines a nearest neighbor cell site or base station from the first base station at the center of the sector.

In some embodiments, the system 100 determines the nearest neighbor base station from the first base station 230 for each subsector (204a-204g). In some embodiments, the system 100 stores the distance between the first base station 230 and the nearest neighboring cell site or base station.

In some embodiments, the system 100 saves the location of each of the neighboring cells in each of the subsectors 204a-g. For example, the system 100 saves the latitude, longitude and azimuth for the neighboring cell site or base station found in each of the subsectors 204a-g. In some embodiments, the system 100 calculates the average distance from the nearest neighboring cell site or base station and the first base station or cell site for each of the subsectors 204a-g. In some embodiments, the system 100 determines the standard deviation of the average distance for each subsector 204a-g.

In some embodiments, the system 100 determines whether the nearest neighboring base station or cell site in each subsector 204a-g is opposite to the first base station 230 or cell site. The system 100 determines the average distance using the average distance of the subsectors 204a-g with a base station opposite the first base station 230. In some embodiments, the system 100 discards the information such as nearest neighboring cell in the first subsector 204a and the last subsector 204g which are not facing the first base station 230 while calculating the average and the standard deviation.

In some embodiments, the system 100 determines a mean distance V based on the average distance in the subsector and the standard deviation of average distance. In some embodiments, the system 100 determines whether the distance of the nearest neighboring cell or the base station is greater than the mean distance V. In response to a determination that the distance of the nearest neighboring cell or the base station is greater than the mean distance v, the system 100 flags the cells as opposing the first base station 230 or cell site. In some embodiments, the system 100 flags the middle three subsectors 204b-204f which are closest to the azimuth of the first base station 230 as directly opposite to the first base station 230 or cell site. For example, the system 100 can set a standard deviation flag of 1 to indicate the nearest neighboring base station or cell site is opposite to the first base station 230. In another example, the system 100 can determine a multiplying factor based on whether bearing angle of the nearest neighboring cell site. In at least one example, the system 100 can determine the bearing angle B of the line joining the longitude and latitude of the first base station 230 or cell site and the nearest neighboring cell site. In some embodiments, the system 100 can determine whether the difference between the bearing angle of the first base station 230 or cell site and the nearest neighboring cell site or base station in a subsector is within a range of −30 degrees to +30 degrees. The system 100 can determine the multiplying factor based on the difference between the bearing angles of the radio beam. The multiplying factor can indicate the degree of orthogonality of the neighboring base station or cell site in the subsector and the first base station 230 or cell site. For example, the multiplying factor is 0.7 if the difference in bearing angle is within a range of −30 degrees to +30 degrees. In another example, the multiplying factor is 1.5 when the difference between the bearing angles is outside the range of −30 degrees to +30 degrees.

In some embodiments, the system 100 determines the gain for each subsector. In at least one example, the system 100 determines the gain for subsectors closest to the azimuth of the first base station or cell site is two and the gain for the sectors that are further away from the azimuth of the first base station or cell site is one. In some embodiments, the system 100 determines the cell range for the base station based on the distance of the first base station 230 or cell site from the neighboring base station and the gain of the neighboring base station. For example, the system 100 determines the cell range use the formula, Cell Range=sum (D_i*M_i*G_i*StdDev_i)/sum (G_i*If Neighbor Found (i)*StdDev_i), where D_i is the distance between the first base station and the nearest neighboring base station, M_i is the multiplying factor for the first base station and the nearest neighboring base station M in a subsector, G_i is the gain of the subsector and StdDev_i is the standard deviation flag of the subsector.

In some embodiments, the system 100 sets a default value, such as 11 kilometers if the calculated cell range is zero or infinity. For example, the default value is based on the manufacturer's specifications.

In some embodiments, the system 100 determines whether a cell site in a subsector 204a-g is a suspected booming site based on the timing advance distribution key performance indicator data. The system 100 retrieves information about on-air cell sites or base stations from the site database. In at least one example, the system 100 determines the count of the continuous gaps in the timing advance distribution key performance indicator data to determine the range beyond a cell site may be booming. In some embodiments, the system 100 determines the booming samples measured during a drive test. In some embodiments, the system 100 determines the booming samples based on data logged in the system 100 from user equipment in the subsectors. In some embodiments, system 100 determines the booming samples that are received beyond the configured count of the continuous gaps. The system 100, determines the percentage of booming samples based on the sum of the booming samples detected after the defined continuous gap and the total number of timing advance distribution samples for a cell. In some embodiments, the system 100 determines whether the percentage of booming samples is greater than a booming sample threshold. In some embodiments, the system 100 discards the cell site if the booming sample threshold is less than the percentage of the booming samples.

In some embodiments, the system 100 excludes on-air cell sites or base stations from the site database to determine the distant suspected cell site. In some embodiments, the system 100 retrieves the timing advance distribution key performance indicator data from the site database. In some embodiments, the system 100 identifies the new acceptable coverage limit or cell range based on the automatic cell range algorithm as disclosed above. In some embodiments, the system 100 can determine whether the booming samples in the timing advance distribution key performance indicator is beyond the calculated cell range. Based on a determination that the booming samples are beyond the calculated cell range, the system 100 can identify the percentage of booming samples based on the sum of booming samples that are beyond the calculated cell range and the total number of timing analysis samples for the cell.

In some embodiments, the system 100 determines whether the percentage of booming samples is greater than a booming sample threshold. The booming sample threshold can be based on historical data. In some embodiments, the system 100 discards the cell site if the booming sample threshold is less than the percentage of the booming samples.

In some embodiments, the system 100 can determine whether a suspected booming cell site needs more information before it is identified as a booming cell site based on the acceptable coverage limit. In some embodiments, the system 100 determines whether to mark a cell as a booming cell based on the acceptable coverage limit such as the manufacturer specification limits. In some embodiments, the system 100 determines whether to mark a cell as a booming cell based on the automated cell range algorithm described above. In some embodiments, the system 100 can retrieve cells identified as suspected booming cell sites from the site database. The system 100 can determine whether the acceptable coverage limit is available. Based on a determination that the acceptable coverage limit value is not available, the system 100 can assign the automated cell range to the cell. The system 100 can determine whether the count of the geo-located samples in a cell is greater than a minimum threshold of samples. Based on a determination, that the count of the geo-located samples in the cell is greater than the minimum threshold of samples, the system 100 can exclude or discard the data on the cell site from further calculation. The system 100 can identify the cell sites or base station where more information is to be collected based on the minimum threshold of samples and the count of the geo-located samples.

Figure 2:
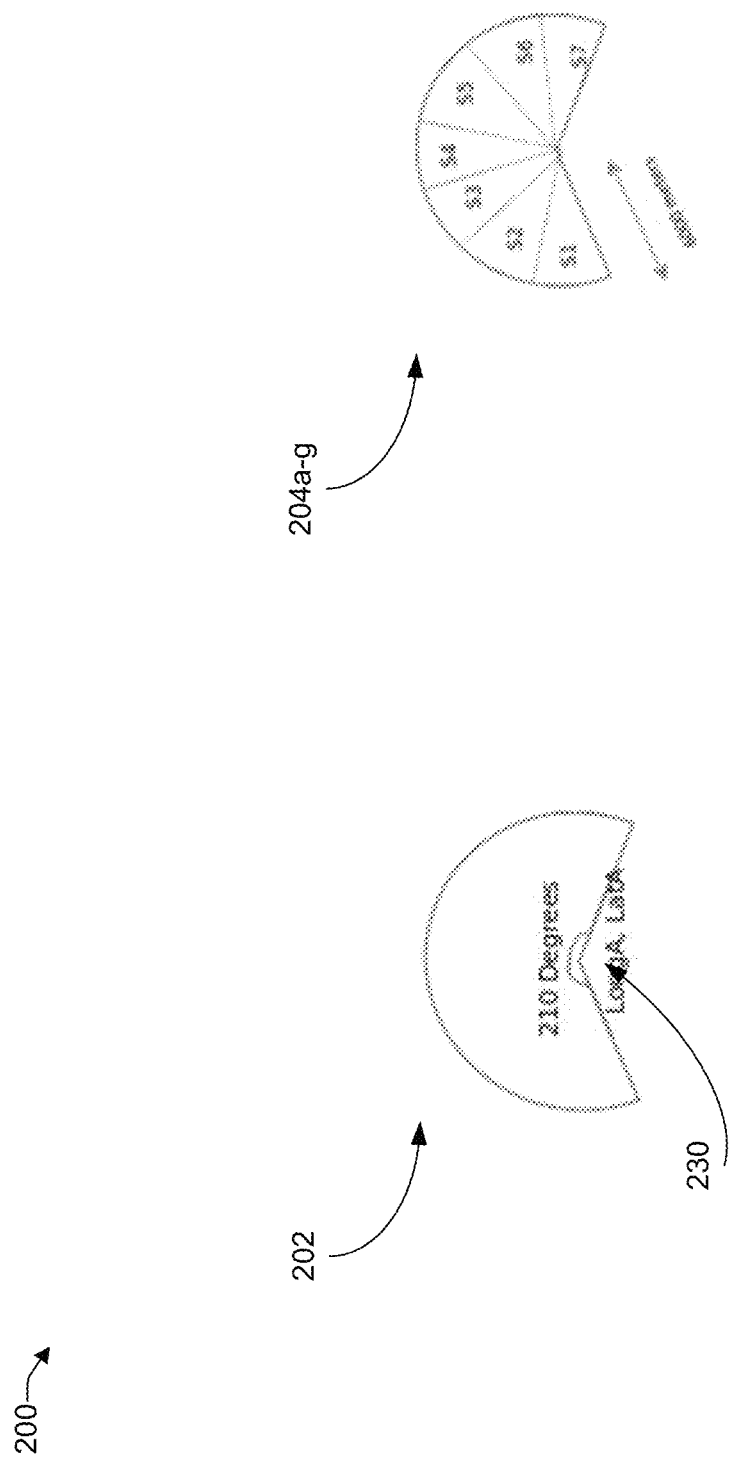
FIG. 2 is a diagram of a sector generated for acceptable coverage limit determination, according to at least one embodiment of the present system.

FIG. 2 is a diagram of a sector generated for electronic tilt determination, according to at least one embodiment of the present system. In some embodiments, the system 100 determines a sector 105 degrees to the left and the right side of the azimuth line of the radio or antenna. In some embodiments, the system 100 divides the sector 202 into subsectors 204*a-g*. In some embodiments, the system 100 divides the section of 210 degrees into seven subsectors 204*a-g* of 30 degrees each. In some embodiments, the number of subsectors is based on the bearing angle and coverage of the radio signals.

Figure 3:
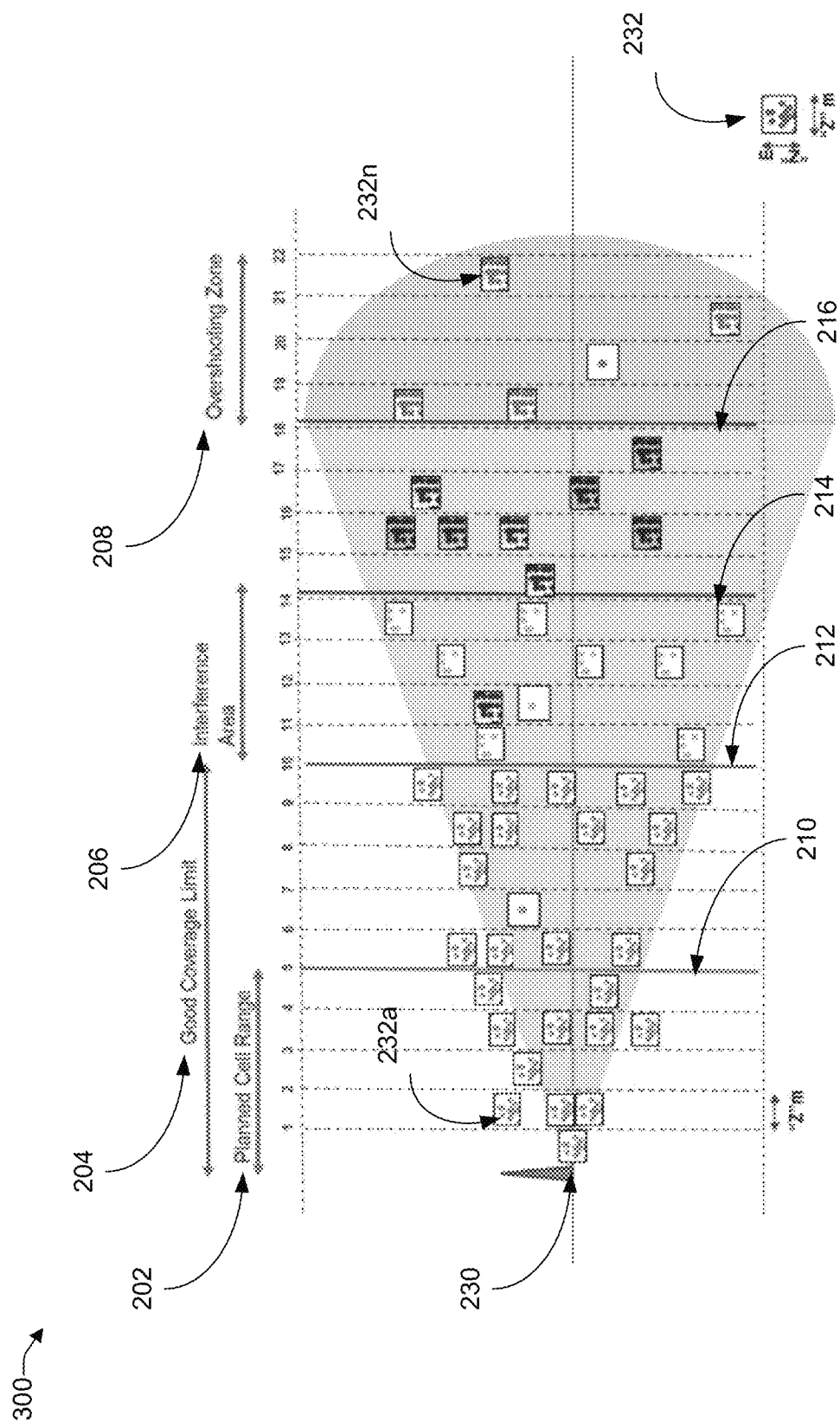
FIG. 3 is a diagram for a grid generated, according to at least one embodiment of the present system.

FIG. 3 is a diagram of a grid layout generated by the system 100 for determining acceptable coverage limit and generating an electronic recommendation, according to at least one embodiment of the present system. In some embodiments, the system 100 retrieves a list of cells that are served by the first base station 230 from the site database. In some embodiments, the system 100 retrieved data that includes a predetermined threshold of geo-located samples that are beyond an acceptable coverage limit 204. In some embodiments, the system 100 generates grids 232*a-n* of z meters by z meters (only some grids are highlighted in the figure) from the first base station 230 to a predetermined threshold distance in the direction of the azimuth of the first base station 230. In at least one example, the grids 232 are 50 meter×50 meter grids.

In some embodiments, the system 100 identifies a plurality of selected grids that are between an acceptable coverage limit provided by the manufacturer and the predetermined threshold distance from the plurality of grids. In some embodiments, the system, 100 determines an average reference signal received power from the first base station 230 in a cell site located within each of the selected grids. In some embodiments, the system 100, determines a median grid level reference signal received power for cell sites from neighboring base stations that are received at each of the selected girds. In some embodiments, the system 100 evaluates whether the first base station 230 is a dominant cell in each of the plurality of selected grids based on the average reference signal received power and the median grid level reference signal. In some embodiments, the system 100 determines a count of grids in the plurality of selected grids where the first base station 230 is a dominant cell site based on a dominant carrier threshold. In at least one example, the dominant carrier threshold is a percentage of the average reference power signal and the median grid level reference signal.

In some embodiments, the system, 100 determines a column of grids 214 where the first base station 230 is no longer a dominant cell site based on the dominant carrier threshold. In some embodiments, the system 100 determines the acceptable coverage limit based on the distance from the first base station 230 and the determined column of grids 214. In some embodiments, the system 100 determines whether the average reference signal received power is greater than the median reference signal received power based on a threshold difference parameter indicating the deviation between the values that is acceptable. In some embodiments, the system 100 based on the determination that the average reference signal received power is greater, marks the first base station 230 as the dominant cell.

In some embodiments, the system 100 retrieves a list of cells that are served by a first base station 230 from a site database. In some embodiments, the system 100 retrieves a predetermined threshold of geo-located samples that are beyond an acceptable coverage limit 204. In some embodiments, the system 100 generates a plurality of girds from the first base station 230 to a predetermined threshold distance in the direction of the azimuth of the first base station 230. In some embodiments, the system 100 identifies selected grids that are between the acceptable coverage limit and the predetermined threshold distance from the first base station 230. In some embodiments, the system 100, determines an average reference signal received power from the first base station 230 in a cell site located within each of the selected grids. In some embodiments, the system 100 determines a median grid level reference signal received power for cell sites from base stations that are received at each of the selected girds. In some embodiments the system 100 evaluates whether the first base station 230 is a dominant cell in each of the selected grids based on the average reference signal received power and the median grid level reference signal. In some embodiments, the system 100 determines a count of grids in the selected grids where the first base station 230 is a dominant cell site based on a dominant carrier threshold. In some embodiments, the system 100 determines a column of grids where the first base station 230 is no longer a dominant cell site based on the dominant carrier threshold. In some embodiments, the system 100 determines an acceptable coverage limit based on the distance from the first base station 230 and the determined column of grids.

Figure 4:
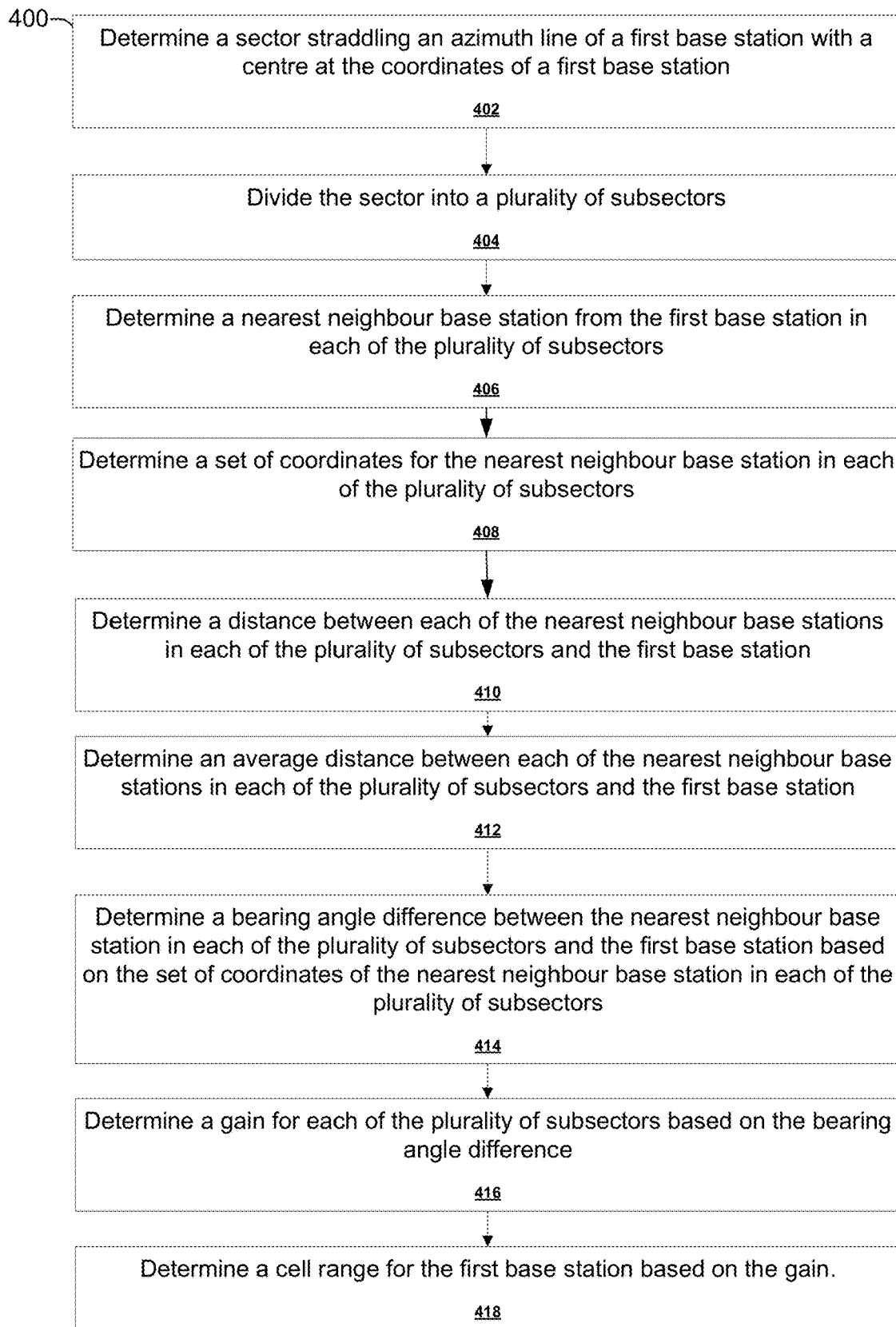
FIG. 4 is an operational flow of a method for automatic cell range determination, according to at least one embodiment of the present system.

FIG. 4 is an operational flow for determining a cell range for a first base station in accordance with at least one embodiment. In some embodiments, the first base station corresponds to the first base station 230 (FIG. 2). In some embodiments, the method 400 is implemented using a controller of a system, such as system 100 (FIG. 1), or another suitable system. In at least some embodiments, the method is performed by the system 100 or a controller shown in FIG. 8 including sections for performing certain operations, such as the system shown in FIG. 8 which will be explained hereinafter. At S402, the controller, such as the controller in FIG. 8, determines a sector straddling an azimuth line of a first base station as shown in FIG. 2 with a center at the coordinates of a first base station 230.

In some embodiments, at S404, the controller divides the sector into a plurality of sub-sectors. In at least one example, the sector is divided into a plurality of subsectors 204*a-j* as shown in FIG. 2, for example using system 100 (FIG. 1). In some embodiments, at S406 the controller determines a nearest neighbor base station from the first base station in each of the plurality of subsectors. In at least one example, the controller determines the nearest neighbor base station from the first base station 230 in each of the plurality of subsectors 204*a-j*.

In some embodiments, at S408 the controller determines a set of coordinates for the nearest neighbor base station in each of the plurality of subsectors. In at least one example, the controller determines a set of coordinates for the nearest neighbor base station in each of the plurality of subsectors 204*a-j*, for example using system 100 (FIG. 1). In some embodiments, at S410 the controller determines a distance between each of the nearest neighbor base stations in each of the plurality of subsectors and the first base station. In at least one example, the controller determines the distance between each of the nearest neighbor base stations in each of the plurality of subsectors 204*a-j* and the first bases station 230, for example using system 100 (FIG. 1). In some embodiments, the controller at S412 determines an average distance between each of the nearest neighbor base stations in each of the plurality of subsectors and the first base station. In at least one example, the controller determines an average distance between each of the nearest neighbor base stations in each of the plurality of subsectors 204*a-j* and the first base station 230, for example using system 100 (FIG. 1). In some embodiments, the controller at S414 determines a bearing angle difference between the nearest neighbor base station in each of the plurality of subsectors and the first base station based on the set of coordinates of the nearest neighbor base station in each of the plurality of subsectors. In at least one example, the controller determines a bearing angle difference between the nearest neighbor base station in each of the plurality of subsectors and the first base station 230 based on the set of coordinates of the nearest neighbor base station in each of the plurality of subsectors, for example using system 100 (FIG. 1). In some embodiments, the controller at S416 determines a gain for each of the plurality of subsectors based on the bearing angle difference. In some embodiments, at S416 the controller determines a cell range for the first base station based on the determined gain, for example using system 100 (FIG. 1).

Figure 5:
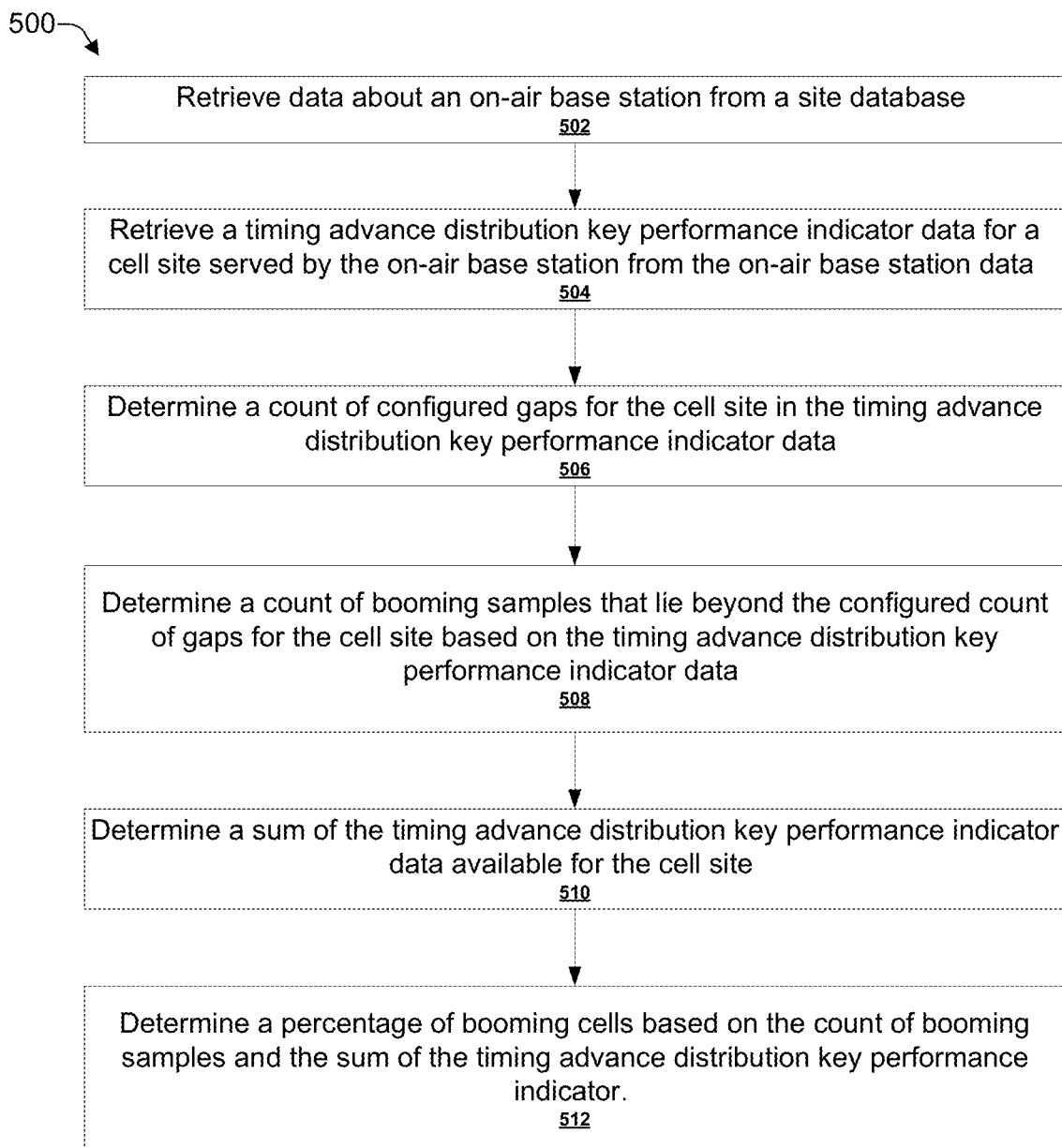
FIG. 5 is an operational flow of a method for identifying suspected booming cells, according to at least one embodiment of the present system.

FIG. 5 is an operational flow for suspected cell identification, according to at least one embodiment of the present system. In some embodiments, the method 500 is implemented using a controller of a system, such as system 100 (FIG. 1), or another suitable system.

In some embodiments at S502, the controller retrieves data about an on-air base station from a site database. In at least one example, the controller such as the controller in FIG. 8 retrieves data about an on-air base station 230 from a site database, for example using the system 100 (FIG. 1). In some embodiments, at S504, the controller retrieves a timing advance distribution key performance indicator data for a cell site served by the on-air base station from the on-air base station data. In at least one example, the controller such as the controller in FIG. 8 retrieves a timing advance distribution key performance indicator data for a cell site served by the on-air base station 230 from the on-air base station data. In some embodiments at S506, the controller determines a count of configured gaps for the cell site in the timing advance distribution key performance indicator data. In at least one example, the controller such as the controller in FIG. 8, determines a count of configured gaps for the cell site in the timing advance distribution key performance indicator data. In some embodiments at S508, the controller determines a count of booming samples that lie beyond the configured count of gaps for the cell site based on the timing advance distribution key performance indicator data. In at least one example, the controller such as the controller in FIG. 8, determines a count of booming samples that lie beyond the configured count of gaps for the cell site based on the timing advance distribution key performance indicator data. In some embodiments, at S510, the controller determines a sum of the count of the timing advance distribution key performance indicator data available for the cell site. In at least one example, the controller such as the controller in FIG. 8, determines a sum of the count of the timing advance distribution key performance indicator data available for the cell site. In some embodiments, at S512, the controller determines a percentage of booming cells based on the count of booming samples and the sum of the count of the timing advance distribution key performance indicator. In at least one example, the controller such as the controller in FIG. 8, the controller determines a percentage of booming cells based on the count of booming samples and the sum of the count of the timing advance distribution key performance indicator.

Figure 6:
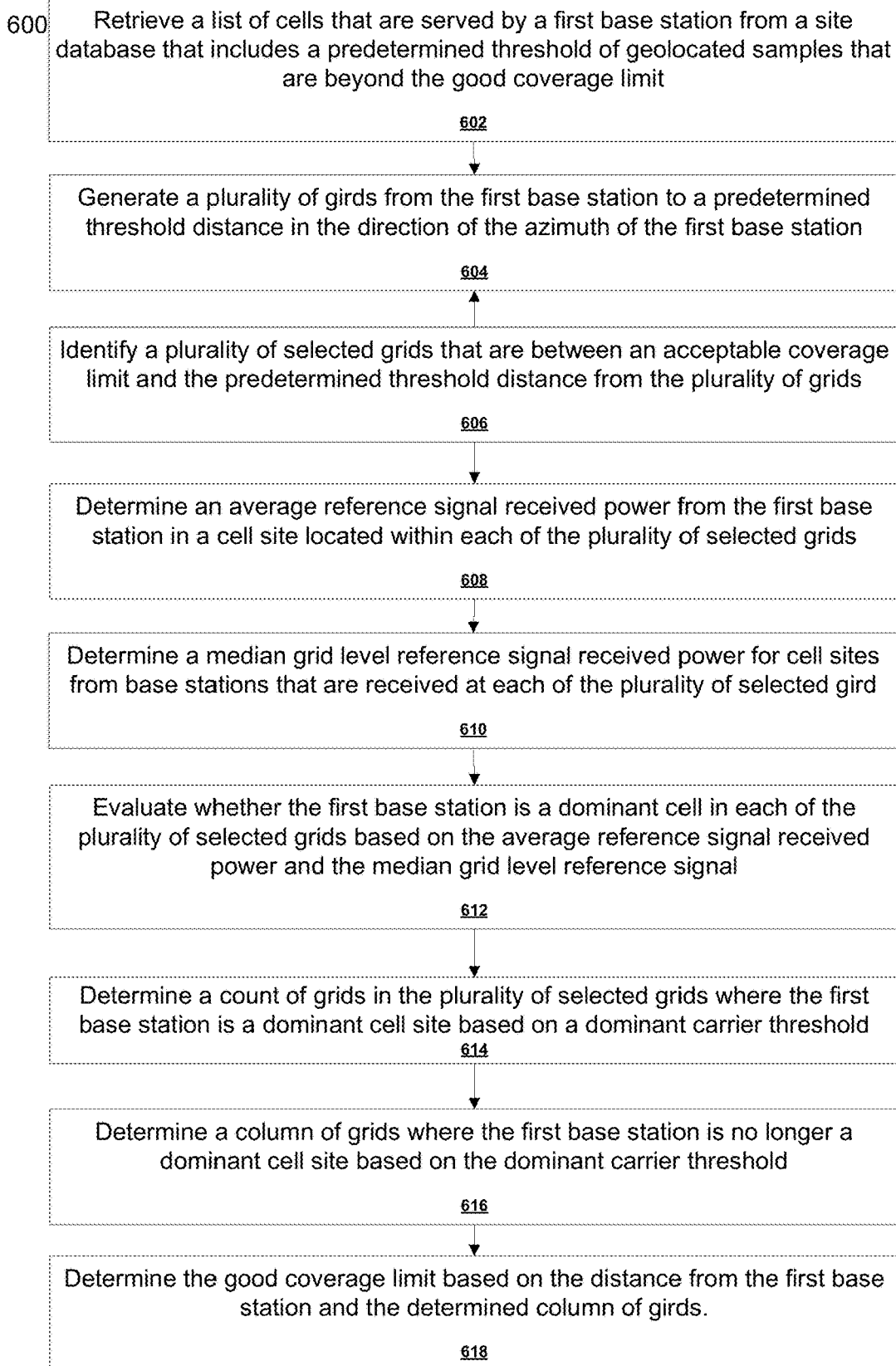
FIG. 6 is an operational flow of a method for determining acceptable coverage limit, according to at least one embodiment of the present system.

FIG. 6 is an operational flow for acceptable coverage limit, according to at least one embodiment of the present system. In some embodiments, the method 600 is implemented using a controller of a system, such as system 100 (FIG. 1), or another suitable system. In some embodiments at S602, the controller retrieves a list of cells that are served by a first base station from a site database that includes a predetermined threshold of geo-located samples that are beyond an acceptable coverage limit. In at least one example, the controller retrieves a list of cells that are served by a first base station 230 from a site database that includes a predetermined threshold of geo-located samples that are beyond an acceptable coverage limit 204 as shown in FIG. 3 for example using system 100 (FIG. 1). In some embodiments at S504, the controller generates grids from the first base station to a predetermined threshold distance in the direction of the azimuth of the first base station. In at least one example, the predetermined threshold distance is based on the theoretical limit of the radio transmission from the base station. In at least one examples, the predetermined threshold distance is based on the distance beyond which the processing power required to receive the signals by a user equipment results in quick power drain of the user equipment without substantial improvement in coverage. In at least one example, the controller generates grids 232*a-n* from the first base station 230 to a predetermined threshold distance in the direction of the azimuth of the first base station 230 as shown in FIG. 3 for example using system 100 (FIG. 1). In some embodiments at S606, the controller identifies a plurality of selected grids that are between an acceptable coverage limit provided by the manufacturer and the predetermined threshold distance from the first base station. In at least one example, at S606, the controller identifies a plurality of selected grids that are between an acceptable coverage limit provided by the manufacturer and the predetermined threshold distance from the first base station 230 for example using system 100 (FIG. 1). In some embodiments at S508, the controller determines an average reference signal received power from the first base station in a cell site located within each of the plurality of selected grids, for example using system 100 (FIG. 1). In at least one example, the controller determines an average reference signal received power from the first base station 230 in a cell site located within each of the plurality of selected grids. In some embodiments at S510, the controller determines a median grid level reference signal received power for cell sites from base stations that are received at each of the plurality of selected gird. In at least one example, the controller determines a median grid level reference signal received power for cell sites from base stations that are received at each of the plurality of selected gird. In some embodiments at S512, the controller evaluates whether the first base station is a dominant cell in each of the plurality of selected grids based on the average reference signal received power and the median grid level reference signal. In at least one example, the controller evaluates whether the first base station 230 is a dominant cell in each of the plurality of selected grids based on the average reference signal received power and the median grid level reference signal, for example using system 100 (FIG. 1). In some embodiments, the controller determines a count of grids in the plurality of selected grids where the first base station is a dominant cell site based on a dominant carrier threshold. In at least one example, the controller determines a count of grids in the plurality of selected grids where the first base station 230 is a dominant cell site based on a dominant carrier threshold, for example using system 100 (FIG. 1). In some embodiments, the controller determines a column of grids where the first base station is no longer a dominant cell site based on the dominant carrier threshold. In at least one example, the controller determines a column of grids 212 where the first base station 230 is no longer a dominant cell site based on the dominant carrier threshold, for example using system 100 (FIG. 1). In at least one example, the dominant carrier threshold is based on the threshold at which one carrier signal is available with a higher signal strength compared to the other carrier signal. In at least one example, the dominant carrier threshold is based on the threshold that reduces the power consumption of the user equipment when the dominant carrier signal is used. In some embodiments, the controller determines the acceptable coverage limit based on the distance from the first base station and the determined column of girds. In at least one example, the controller determines the acceptable coverage limit 204 based on the distance from the first base station 230 and the determined column of girds 204a-j, for example using system 100 (FIG. 1).

Figure 7:
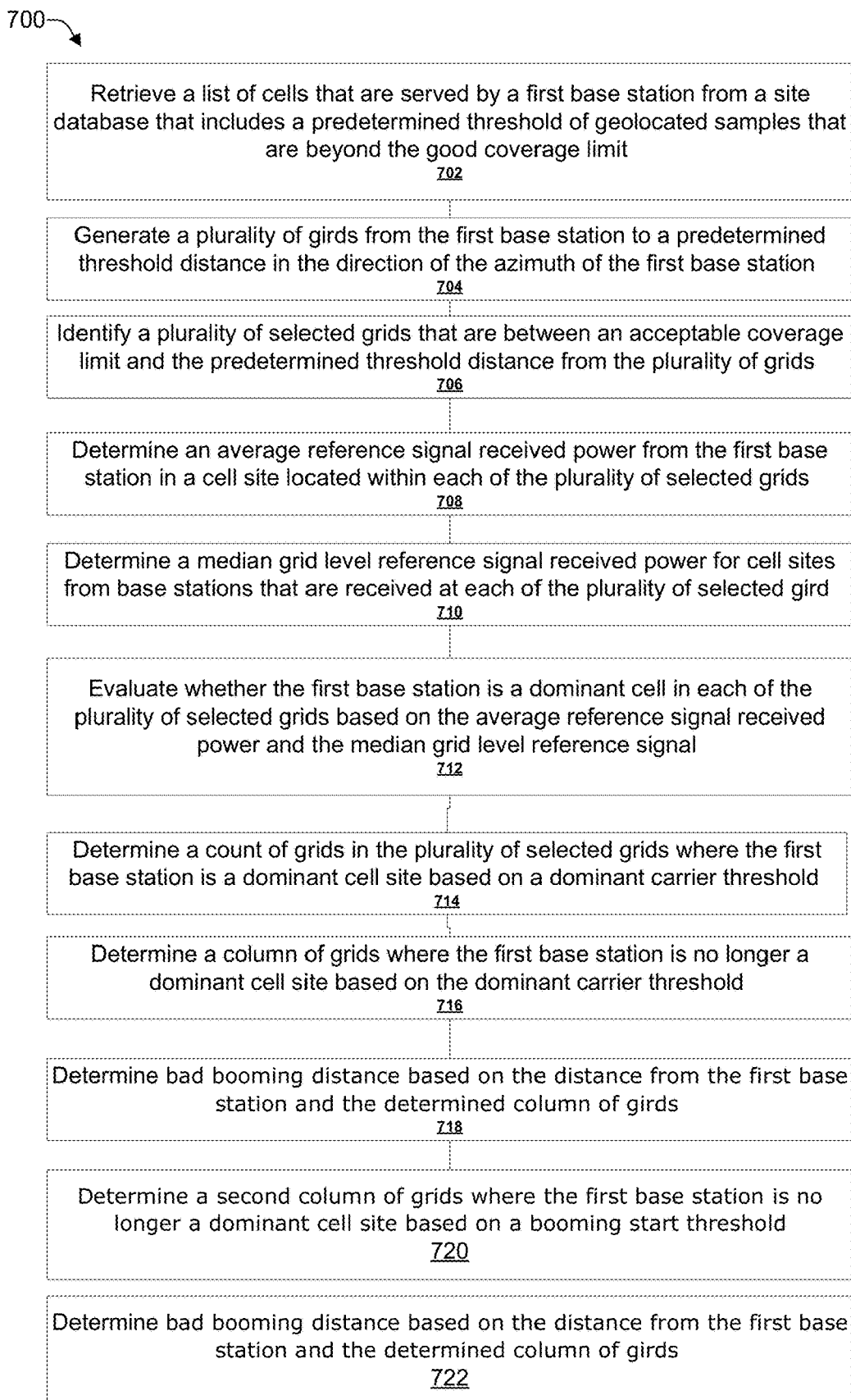
FIG. 7 is an operational flow of a method for determining electronic tilt, according to at least one embodiment of the present system.

FIG. 7 is an operational flow for determining electronic tilt, according to at least one embodiment of the present system. In some embodiments, the method 700 is implemented using controller of a system, such as system 100 or another suitable system.

In some embodiments, at S702, the controller retrieves a list of cells that are served by a first base station from a site database that includes a predetermined threshold of geo-located samples that are beyond an acceptable coverage limit. In at least one example, the controller such as the controller in FIG. 8 the controller retrieves a list of cells that are served by a first base station from a site database that includes a predetermined threshold of geo-located samples that are beyond an acceptable coverage limit, for example using system 100 (FIG. 1). In some embodiments, at S704, the controller generates a plurality of girds from the first base station to a predetermined threshold distance in the direction of the azimuth of the first base station. In at least one example, the controller generates a plurality of girds from the first base station 230 to a predetermined threshold distance in the direction of the azimuth of the first base station 230, for example using the system 100 (FIG. 1). In some embodiments, at S706, the controller identifies a plurality of selected grids that are between an acceptable coverage limit provided by the manufacturer and the predetermined threshold distance from the plurality of grids. In at least one example, the controller identifies a plurality of selected grids that are between an acceptable coverage limit provided by the manufacturer and the predetermined threshold distance from the plurality of grids, for example using the system 100 (FIG. 1). In some embodiments, at S708 the controller determines an average reference signal received power from the first base station in a cell site located within each of the plurality of selected grids. In at least one example, the controller determines an average reference signal received power from the first base station in a cell site located within each of the plurality of selected grids, for example using the system 100 (FIG. 1). In some embodiments, at S710, the controller determines a median grid level reference signal received power for cell sites from base stations that are received at each of the plurality of selected gird. In at least one example, the controller such as the controller in FIG. 8 determines a median grid level reference signal received power for cell sites from base stations that are received at each of the plurality of selected gird, for example using the system 100 (FIG. 1). In some embodiments, at S712, the controller evaluates whether the first base station is not a dominant cell in each of the plurality of selected grids based on the average reference signal received power and the median grid level reference signal. In at least one example, the controller such as the controller in FIG. 8 evaluates whether the first base station is not a dominant cell in each of the plurality of selected grids based on the average reference signal received power and the median grid level reference signal, for example using the system 100 (FIG. 1).

In some embodiments, at S714, the controller determines a count of grids in the plurality of selected grids where the first base station is not a dominant cell site based on a dominant carrier threshold. In at least one example, the controller such as the controller in FIG. 8 determines a count of grids in the plurality of selected grids where the first base station is not a dominant cell site based on a dominant carrier threshold, for example using the system 100 (FIG. 1). In some embodiments, at S716, the controller determines a column of grids where the first base station is no longer a dominant cell site based on the dominant carrier threshold. In at least one example, the controller such as the controller in FIG. 8 determines a column of grids where the first base station is no longer a dominant cell site based on the dominant carrier threshold, for example using the system 100 (FIG. 1). In some embodiments, at S718, the controller determines a bad booming distance based on the distance from the first base station and the determined column of girds. In at least one example, the controller such as the controller in FIG. 8 determines a bad booming distance based on the distance from the first base station and the determined column of girds, for example using the system 100 (FIG. 1). In some embodiments, at S720, the controller determines a second column of grids where the first base station is no longer a dominant cell site based on a booming start threshold. In at least one example, the controller such as the controller in FIG. 8 determines a second column of grids where the first base station is no longer a dominant cell site based on a booming start threshold, for example using the system 100 (FIG. 1).

In some embodiments, the controller stores the determined column of grids as the booming start distance. In some embodiments, at S722, the controller determines a recommended electronic tilt reduction based on at least one of an above mean sea level antenna height, an above mean sea level receiver height, an acceptable coverage limit, and a booming end distance. In some embodiments, the controller determines the proposed e-tilt based on the formula:

Proposed E-Tilt Reduction=Ceil (−(Degrees (ATAN (AMSL Antenna Height−AMSL Receiver Height)/Acceptable Coverage Limit)−ATAN (AMSL Antenna Height−AMSL Receiver Height)/Boomer End Distance))))

Figure 8:
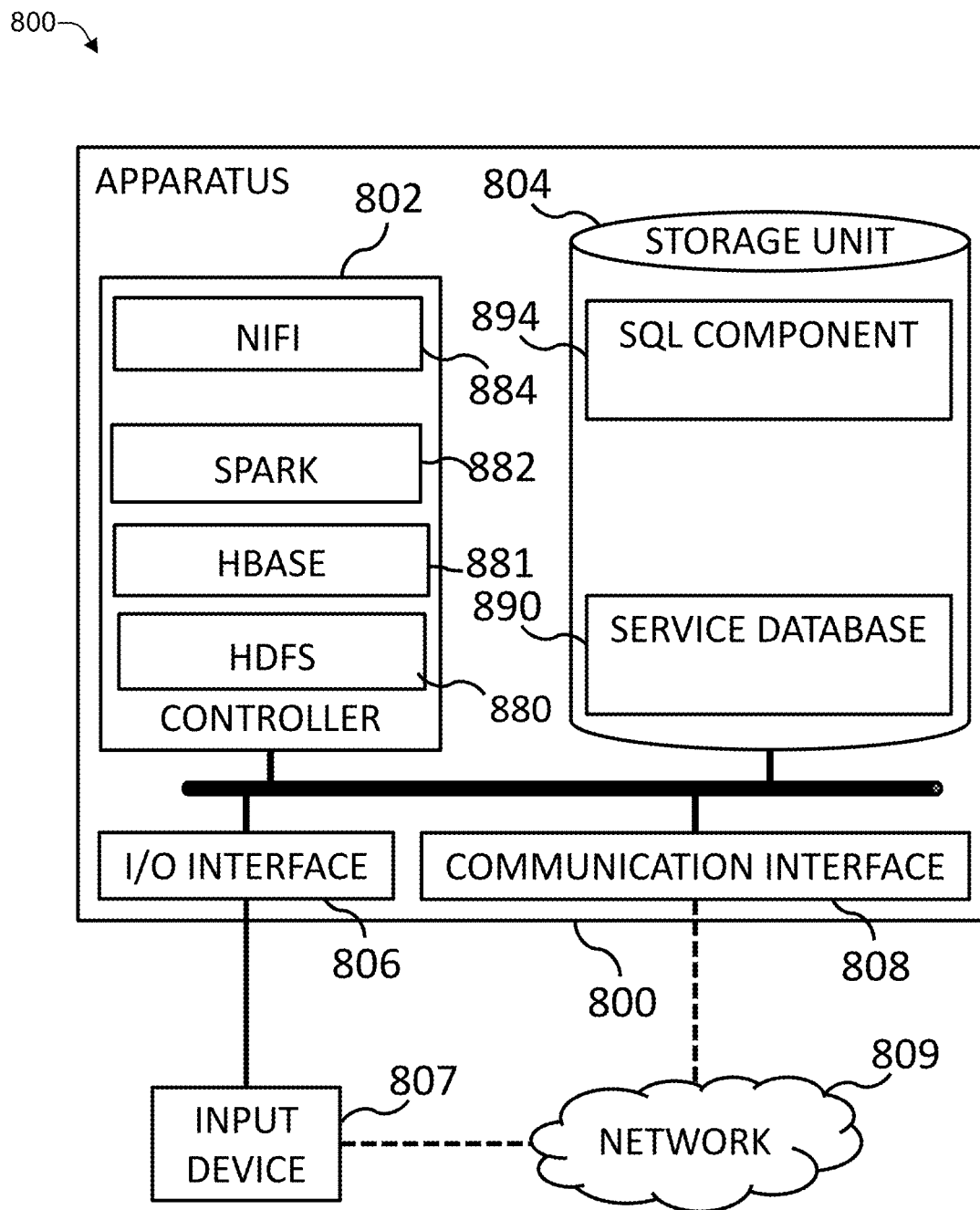
FIG. 8 is a block diagram of an exemplary hardware configuration for automatic cell range detection, according to at least one embodiment of the present system.

Where, AMSL means Above Mean Sea Level, AMSL Antenna Height is the sum of Antenna Height of a cell added to the calculated AMSL value of the same cell, AMSL Receiver Height is the sum of Receiver Height plus the calculated AMSL. FIG. 8 is a block diagram of an exemplary hardware configuration for application artifact registration, according to at least one embodiment of the present system.

The exemplary hardware configuration includes the system 100, which communicates with network 809, and interacts with input device 807. In at least some embodiments, apparatus 800 is a computer or other computing device that receives input or commands from input device 807. In at least some embodiments, the system 100 is a host server that connects directly to input device 807, or indirectly through network 809. In at least some embodiments, the system 100 is a computer system that includes two or more computers. In at least some embodiments, the system 100 is a personal computer that executes an application for a user of the system 100.

The system 100 includes a controller 802, a storage unit 804, a communication interface 808, and an input/output interface 806. In at least some embodiments, controller 802 includes a processor or programmable circuitry executing instructions to cause the processor or programmable circuitry to perform operations according to the instructions. In at least some embodiments, controller 802 includes analog or digital programmable circuitry, or any combination thereof. In at least some embodiments, controller 802 includes physically separated storage or circuitry that interacts through communication. In at least some embodiments, storage unit 804 includes a non-volatile computer-readable medium capable of storing executable and non-executable data for access by controller 802 during execution of the instructions. Communication interface 808 transmits and receives data from network 809. Input/output interface 806 connects to various input and output units, such as input device 807, via a parallel port, a serial port, a keyboard port, a mouse port, a monitor port, and the like to accept commands and present information.

Controller 802 includes a NiFi component 884, a spark component 882, an HBase component 881, a HDFS component 880, and a micro service component 878. NiFI component 884 is the circuitry or instructions of controller 802 configured to process a stream of information from a device or a server. In at least some embodiments, NiFi component 884 is configured to receive information such as information from an open-RAN network. In at least some embodiments, the NiFI component is configured for deployment of a software service in a cloud native environment to process information in real-time. In at least some embodiments, the NiFi component 884 records information to storage unit 804, such as the site database 890, and utilize information in storage unit 804. In at least some embodiments, the NiFI component 884 includes sub-sections for performing additional functions, as described in the foregoing flow charts. In at least some embodiments, such sub-sections may be referred to by a name associated with their function.

The spark component 882 is the circuitry or instructions of controller 802 configured to create service specifications. In at least some embodiments, the spark component 882 is configured to determine an automatic cell range. In at least some embodiments, the spark component 82 utilizes information in storage unit 804, the Hbase component 881, and the HDFS component 880. In at least some embodiments, the spark component 882 includes sub-sections for performing additional functions, as described in the foregoing flow charts. In at least some embodiments, such sub-sections may be referred to by a name associated with their function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present system are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present system include a system, a method, and/or a computer program product. In some embodiments, the computer program product includes a computer readable storage medium (or media) having computer readable program instructions thereon for causing a processor to carry out aspects of the present system.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present system.

While embodiments of the present system have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present system, an acceptable coverage limit of a base station is identified in an application by retrieving a list of cells that are served by a first base station from a site database that includes a predetermined threshold of sufficient geo-located samples that are beyond the cell range or the acceptable coverage limit, generating a plurality of girds from the first base station to a predetermined threshold distance in the direction of the azimuth of the first base station, identifying a plurality of selected grids that are between the acceptable coverage limit and the predetermined threshold distance, from the plurality of grids, determining an average reference signal received power from the first base station in the cell site located within each of the plurality of selected grids, determining a median grid level reference signal received power for cell sites from base stations that are received at each of the plurality of selected gird, evaluating whether the first base station is the dominant cell in each of the plurality of selected grids based on the average reference signal received power and the median grid level reference signal, determining the number of grids in the plurality of selected grids where the first base station is the dominant cell site based on a dominant carrier threshold, determining a column of grids where the first base station is no longer the dominant cell site based on the dominant carrier threshold, and determining the acceptable coverage limit of the cell based on the distance from the first base station and the determined column of girds.

Some embodiments include the instructions in a computer program, the method performed by the processor executing the instructions of the computer program, and a system that performs the method. In some embodiments, the system includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium instructions executable by a computer to cause the computer to perform operations comprising:
   retrieving a list of cells that are served by a first base station from a site database that includes a predetermined threshold of geo-located samples that are beyond an acceptable coverage limit;
   generating a plurality of girds from the first base station to a predetermined threshold distance in the direction of the azimuth of the first base station;
   identifying a plurality of selected grids that are between an acceptable coverage limit and the predetermined threshold distance from the plurality of grids;
   determining an average reference signal received power from the first base station in a cell site located within each of the plurality of selected grids;
   determining a median grid level reference signal received power for cell sites from base stations that are received at each of the plurality of selected gird;
   evaluating whether the first base station is a dominant cell in each of the plurality of selected grids based on the average reference signal received power and the median grid level reference signal;
   determining a count of grids in the plurality of selected grids where the first base station is a dominant cell site based on a dominant carrier threshold;
   determining a column of grids where the first base station is no longer a dominant cell site based on the dominant carrier threshold; and
   determining the acceptable coverage limit based on the distance from the first base station and the determined column of grids.

2. The non-transitory computer-readable medium of claim 1, wherein the instructions executable by the computer are configured to cause the computer to:
   determine whether the predetermined threshold distance is equal to the distance of the selected grid; and
   based on a determination that the predetermined threshold distance is equal to the distance of the selected grid, mark the cell site in the grid as wanted booming cell.

3. The non-transitory computer-readable medium of claim 1, wherein to evaluate whether the first base station is the dominant cell in each of the plurality of selected grids based on the average reference signal received power and the median grid level reference signal, the instructions executable by the computer are configured to cause the computer to:
   determine whether the average reference signal received power is greater than the median reference signal received power based on an acceptable threshold difference; and
   based on the determination that the average reference signal received power is greater, the first base station is identified as the dominant cell.

4. The non-transitory computer-readable medium of claim 1, wherein the instructions executable by the computer are configured to cause the computer to; determine a count of grids in the plurality of selected grids where the first base station is a dominant cell site based on the dominant carrier threshold value of seventy percent.

5. The non-transitory computer-readable medium of claim 1, wherein to determine a list of cells that exceed a predetermined threshold of geo-located samples that are beyond an acceptable coverage limit, the instructions executable by the computer are configured to cause the computer to:
   retrieve an on-air base station from a site database;
   retrieve a timing advance distribution key performance indicator data for a cell site served by the on-air base station from the list;
   determine a count of configured gaps for the cell site in the timing advance distribution key performance indicator data;
   determine a count of booming samples that lie beyond the configured count of gaps for the cell site based on the timing advance distribution key performance indicator data;
   determine a sum of the timing advance distribution key performance indicator data available for the cell site; and
   determine a percentage of booming cells based on the count of booming samples and the sum of the timing advance distribution key performance indicator.

6. The non-transitory computer-readable medium of claim 1, wherein to determine a list of cells that exceed a predetermined threshold of geo-located samples that are beyond the acceptable coverage limit, the instructions executable by the computer are configured to cause the computer to:
   retrieve an on-air base station that is not a sustained booming cell site from a site database;
   retrieve a timing advance distribution key performance indicator data for a cell site served by the on-air base station from the list;
   determine a cell range for the on-air base station based on an automated cell range algorithm;
   determine a count of booming samples that lie beyond the cell range for the cell site based on the timing advance distribution key performance indicator data;

determine a sum of the timing advance distribution key
performance indicator data available for the cell site;
and determine a percentage of booming cells based on the
count of booming samples and the sum of the timing
advance distribution key performance indicator.

7. A method comprising:
retrieving a list of cells that are served by a first base
station from a site database that includes a predetermined threshold of geo-located samples that are beyond
the acceptable coverage limit;
generating a plurality of girds from the first base station
to a predetermined threshold distance in the direction of
the azimuth of the first base station;
identifying a plurality of selected grids that are between
an acceptable coverage limit and the predetermined
threshold distance from the plurality of grids;
determining an average reference signal received power
from the first base station in a cell site located within
each of the plurality of selected grids;
determining a median grid level reference signal received
power for cell sites from base stations that are received
at each of the plurality of selected gird;
evaluating whether the first base station is a dominant cell
in each of the plurality of selected grids based on the
average reference signal received power and the
median grid level reference signal;
determining a count of grids in the plurality of selected
grids where the first base station is a dominant cell site
based on a dominant carrier threshold;
determining a column of grids where the first base station
is no longer a dominant cell site based on the dominant
carrier threshold; and
determining the acceptable coverage limit based on the
distance from the first base station and the determined
column of grids.

8. The method of claim 7, comprising:
determining whether the predetermined threshold distance is equal to the distance of the selected grid; and
based on a determination that the predetermined threshold
distance is equal to the distance of the selected grid,
marking the cell site in the grid as wanted booming cell.

9. The method of claim 7, wherein to evaluate whether the
first base station is the dominant cell in each of the plurality
of selected grids based on the average reference signal
received power and the median grid level reference signal,
the method comprises:
determining whether the average reference signal
received power is greater than the median reference
signal received power based on an acceptable threshold
difference; and
based on the determination that the average reference
signal received power is greater, the first base station is
identified as the dominant cell.

10. The method of claim 7, wherein the dominant carrier
threshold is seventy percent.

11. The method of claim 7, wherein to determine a list of
cells that exceed a predetermined threshold of geo-located
samples that are beyond the cell range, the method comprises:
retrieving an on-air base station from a site database;
retrieving a timing advance distribution key performance
indicator data for a cell site served by the on-air base
station from the list;
determining a count of configured gaps for the cell site in
the timing advance distribution key performance indicator data;

determine a count of booming samples that lie beyond the
configured count of gaps for the cell site based on the
timing advance distribution key performance indicator
data;
determining a sum of the timing advance distribution key
performance indicator data available for the cell site;
and
determining a percentage of booming cells based on the
count of booming samples and the sum of the timing
advance distribution key performance indicator.

12. The method of claim 7, wherein to determine a list of
cells that exceed a predetermined threshold of geo-located
samples that are beyond the acceptable coverage limit, the
method comprises:
retrieving an on-air base station that is not a sustained
booming cell site from a site database;
retrieving a timing advance distribution key performance
indicator data for a cell site served by the on-air base
station from the list;
determining a cell range for the on-air base station based
on an automated cell range algorithm;
determining a count of booming samples that lie beyond
the cell range for the cell site based on the timing
advance distribution key performance indicator data;
determining a sum of the timing advance distribution key
performance indicator data available for the cell site;
and
determining a percentage of booming cells based on the
count of booming samples and the sum of the timing
advance distribution key performance indicator.

13. An apparatus comprising:
a controller including circuitry configured to:
retrieving a list of cells that are served by a first base
station from a site database that includes a predetermined threshold of geo-located samples that are
beyond the acceptable coverage limit;
generating a plurality of girds from the first base station
to a predetermined threshold distance in the direction
of the azimuth of the first base station;
identifying a plurality of selected grids that are between
an acceptable coverage limit and the predetermined
threshold distance from the plurality of grids;
determining an average reference signal received
power from the first base station in a cell site located
within each of the plurality of selected grids;
determining a median grid level reference signal
received power for cell sites from base stations that
are received at each of the plurality of selected gird;
evaluating whether the first base station is a dominant
cell in each of the plurality of selected grids based on
the average reference signal received power and the
median grid level reference signal;
determining a count of grids in the plurality of selected
grids where the first base station is a dominant cell
site based on a dominant carrier threshold;
determining a column of grids where the first base
station is no longer a dominant cell site based on the
dominant carrier threshold; and
determining the acceptable coverage limit based on the
distance from the first base station and the determined column of grids.

14. The apparatus of claim 13, wherein the controller is
configured to:
determine whether the predetermined threshold distance
is equal to the distance of the selected grid; and based on a determination that the predetermined threshold distance is equal to the distance of the selected grid, mark the cell site in the grid as designated booming cell.

15. The apparatus of claim 13, wherein to evaluate whether the first base station is the dominant cell in each of the plurality of selected grids based on the average reference signal received power and the median grid level reference signal, the controller is configured to:
   determine whether the average reference signal received power is greater than the median reference signal received power based on an acceptable threshold difference; and
   based on the determination that the average reference signal received power is greater, identify the first base station as the dominant cell.

16. The apparatus of claim 13, wherein the dominant carrier threshold is seventy percent.

17. The apparatus of claim 13, wherein to determine a list of cells that exceed a predetermined threshold of geo-located samples that are beyond the acceptable coverage limit, the controller is configured to:
   retrieve an on-air base station from a site database;
   retrieve a timing advance distribution (TAD) key performance indicator data for a cell site served by the on-air base station from the list;
   determine a count of configured gaps for the cell site in the timing advance distribution key performance indicator data;
   determine a count of booming samples that lie beyond the configured count of gaps for the cell site based on the timing advance distribution key performance indicator data;
   determine a sum of the timing advance distribution key performance indicator data available for the cell site; and
   determine a percentage of booming cells based on the count of booming samples and the sum of the timing advance distribution key performance indicator.

18. The apparatus of claim 13, wherein to determine a list of cells that exceed a predetermined threshold of geo-located samples that are beyond the acceptable coverage limit, the controller is configured to:
   retrieve an on-air base station that is not a sustained booming cell site from a site database;
   retrieve a timing advance distribution key performance indicator data for a cell site served by the on-air base station from the list;
   determine a cell range for the on-air base station based on an automated cell range algorithm;
   determine a count of booming samples that lie beyond the cell range for the cell site based on the timing advance distribution key performance indicator data;
   determine a sum of the timing advance distribution key performance indicator data available for the cell site; and
   determine a percentage of booming cells based on the count of booming samples and the sum of the timing advance distribution key performance indicator.

* * * * *